(12) United States Patent
Pangaud et al.

(10) Patent No.: US 7,339,546 B2
(45) Date of Patent: Mar. 4, 2008

(54) CONTACTLESS READING SYSTEM FOR CHIP CARDS PLACED ON OBJECTS

(75) Inventors: Nicolas Pangaud, Valbonne (FR); Elias Sabbah, Mougins (FR)

(73) Assignee: ASK S.A., Valbonne (FR)

( * ) Notice: Subject to any disclaimer, the term of this patent is extended or adjusted under 35 U.S.C. 154(b) by 0 days.

(21) Appl. No.: 10/550,293

(22) PCT Filed: Apr. 1, 2004

(86) PCT No.: PCT/FR2004/000824

§ 371 (c)(1),
(2), (4) Date: Sep. 21, 2005

(87) PCT Pub. No.: WO2004/090793

PCT Pub. Date: Oct. 21, 2004

(65) Prior Publication Data

US 2006/0181470 A1    Aug. 17, 2006

(30) Foreign Application Priority Data

Apr. 2, 2003   (FR) .................................. 03 04092

(51) Int. Cl.
*H01Q 11/12* (2006.01)
*H01Q 21/00* (2006.01)
*H01Q 7/00* (2006.01)
*G08B 13/14* (2006.01)

(52) U.S. Cl. ...................... 343/867; 343/741; 343/742; 343/866; 340/572.1; 340/572.2

(58) Field of Classification Search ................ 343/866, 343/867, 878, 888, 892, 742, 741; 235/385; 340/572.1, 572.2
See application file for complete search history.

(56) References Cited

U.S. PATENT DOCUMENTS

| 6,486,780 | B1 * | 11/2002 | Garber et al. ............ 340/572.1 |
| 6,642,896 | B2 * | 11/2003 | Kim ........................... 343/742 |
| 2004/0100413 | A1 * | 5/2004 | Waldner ..................... 343/742 |

FOREIGN PATENT DOCUMENTS

| EP | 0 766 200 | 4/1997 |
| JP | 11-313017 | 11/1999 |
| JP | 2003-69336 | 7/2003 |

* cited by examiner

*Primary Examiner*—Hoang V. Nguyen
*Assistant Examiner*—Robert Karacsony
(74) *Attorney, Agent, or Firm*—James C. Lydon

(57) ABSTRACT

A contactless reading system, wherein a chip card is fixed on a planar support of an object such as a book (11) for identification by means of the data contained in the chip card, and a mobile reader (16) provided with an antenna in order to read the data of the card. The antenna of the reader (16) consists of a small-sized convolution disposed in a series with a large-sized convolution, which are concentric and which have the same winding direction. A maximum value is obtained for the component (H) of the electromagnetic field produced by the antenna parallel to the antenna at a given distance from the antenna. Maximum reception by the chip card of electromagnetic signals emitted by the antenna is obtained when the antenna is disposed in a perpendicular position in relation to the support of the card and at the given distance from the card.

5 Claims, 3 Drawing Sheets

CONTACTLESS READING SYSTEM FOR CHIP CARDS PLACED ON OBJECTS

TECHNICAL FIELD

This invention concerns systems using contactless chip cards smart cards and a reader supplying by electromagnetic coupling the energy necessary for cards so that information contained in the chip of a smart card can be read by the reader and more specifically concerns a contactless reading system for smart cards placed on objects.

BACKGROUND

At present, contactless transceiver systems are widely used in numerous applications. One of these applications is the contactless smart card, which is being increasingly used in various sectors, such as the public transport sector, for example. They have also been developed as a means of payment.

The exchange of information between a contactless card and the associated reader is accomplished by remote electromagnetic coupling between an antenna housed in the contactless card and a second antenna located in the reader. For developing, storing and processing the information, the card is equipped with a chip acting as a memory zone and a microprocessor, which is connected to the antenna.

Another application of contactless smart cards, which is becoming increasingly important, is their use for the identification of objects designed for sale or rental such as books, disks (CD ROM or DVD). In this application, the chip of the card placed on each object contains in memory the identification data of the object, which thus allows the object to be indexed and identified when it is made available to a buyer (in the case of a sale) or a subscriber (in the case of a rental).

Systems for reading labels placed on the cover page of books placed on shelves of a library are available on the market. In this system, the portable reader includes a reading antenna placed on a flat support.

During reading, the flat support is held parallel to the label to be read so that the electromagnetic field provided by the antenna of the reader can close perpendicular to the plane of the label. It is therefore the field lines at the edge of the antenna that are mainly used and this requires the antenna edge to be kept very close to the binding of books, that is at a distance of about 1 cm. Insofar as the bindings are not necessarily aligned, certain books that are shifted to the rear will thus be too far away and will not be detected when the reader passes in front of the books. The antenna must therefore be plated against the bindings of books to be identified whatever be the position of this binding on the shelf, which restricts the effectiveness of the reader as well as the speed of execution.

SUMMARY OF THE INVENTION

This is why the main purpose of the invention is to provide a system for reading objects placed on shelves and fitted with contactless cards for their identification in which the antenna of the portable reader used for the identification is held perpendicular to the plane of the contactless cards and without being in contact or in near-contact with the objects during reading.

The purpose of the invention is thus a contactless reading system featuring contactless smart cards, each smart card being placed on an object with the aim of identifying this object by means of identification data contained in the chip of the card, and a mobile reader equipped mainly with an antenna to read identification data, in which each smart card is fixed on a flat support of the object. The antenna of the reader consists of a flat antenna support on which is fixed at least one turn of small dimension in series with one turn of large dimension, these turns being concentric and having the same direction of winding, so as to obtain a maximum value of the component (H) of the electromagnetic field produced by the antenna parallel to the antenna support so that the reception by a smart card of electromagnetic signals transmitted by the antenna is maximum when the antenna support is placed perpendicular to the flat support of the card.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
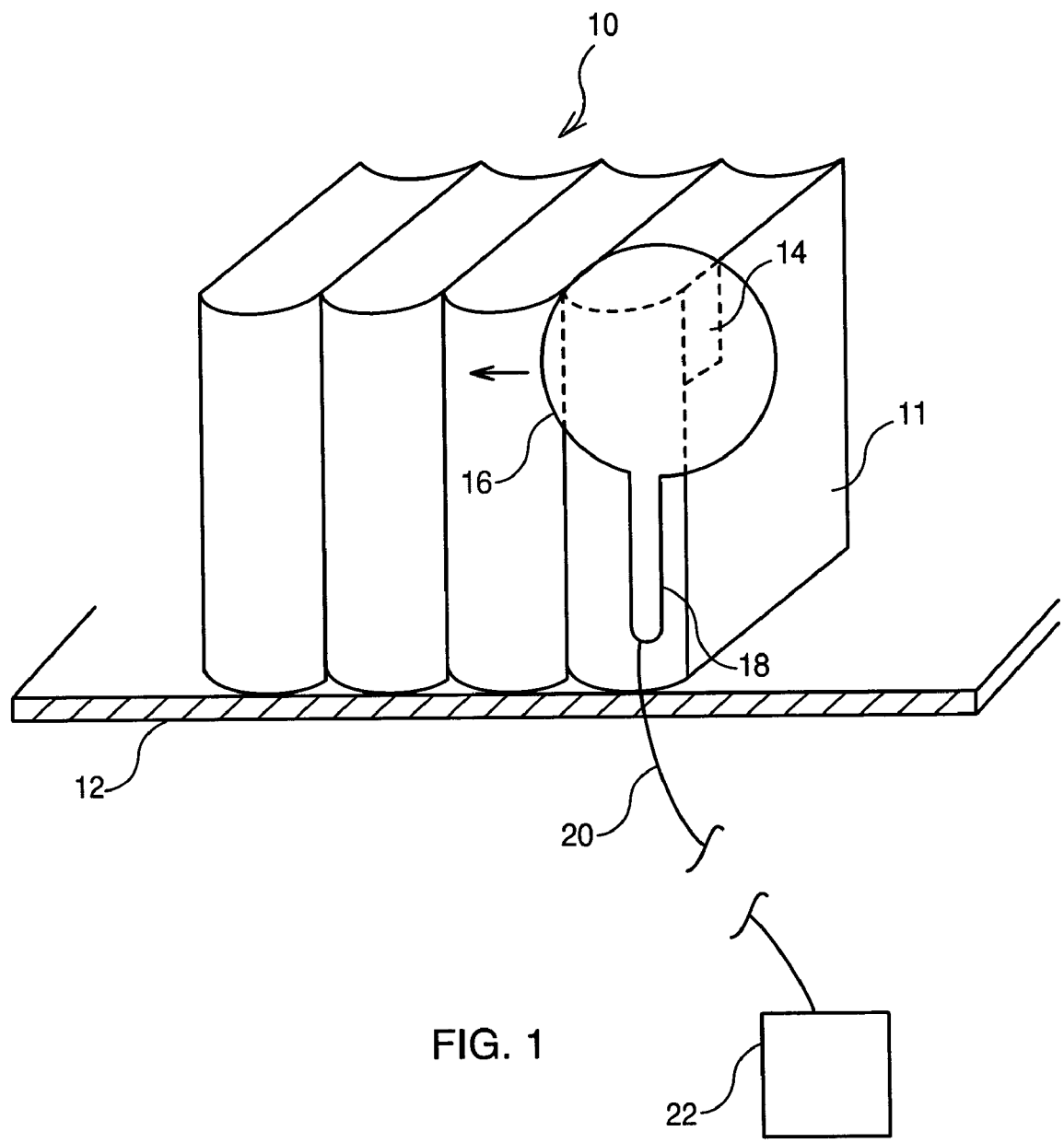
FIG. 1 represents the reading system according to the invention showing the reader in front of a library shelf on which are placed books, each equipped with a contactless card.

The system described below is used in a preferred application of the invention to identify books in a library or a bookshop, either when looking for a particular book, or during stocktaking. In this application, illustrated in FIG. 1, the books 10 are arranged side by side on a shelf 12. Each book, such as book 11, has a contactless card 14 placed on the front cover of the book at a predefined position. It should be noted that the card may be placed on the back cover. This contactless card is a smart card fitted with its antenna to exchange data with a reader. The chip contains the identification of the book on which it is placed but may also contain information on the contents of the book or the identification of persons who have borrowed the book in the case of a library.

The reader used for reading contactless cards is a reader with an antenna support 16, circular in the preferred embodiment, parallel to the book's spine, that is in fact perpendicular to the plane of the covers where the contactless cards are placed which is in this case a vertical plane. The reader also features a handle 18 held in the operator's hand when the reader is moved parallel to the binding of books. A cable 20 connects the reader to a processing unit 22 to collect the data transmitted by the card 14. It should be noted that this communication could be done wirelessly using a transmitter placed in the handle 18 and a receiver at the input of the processing unit 22.

Figure 2:
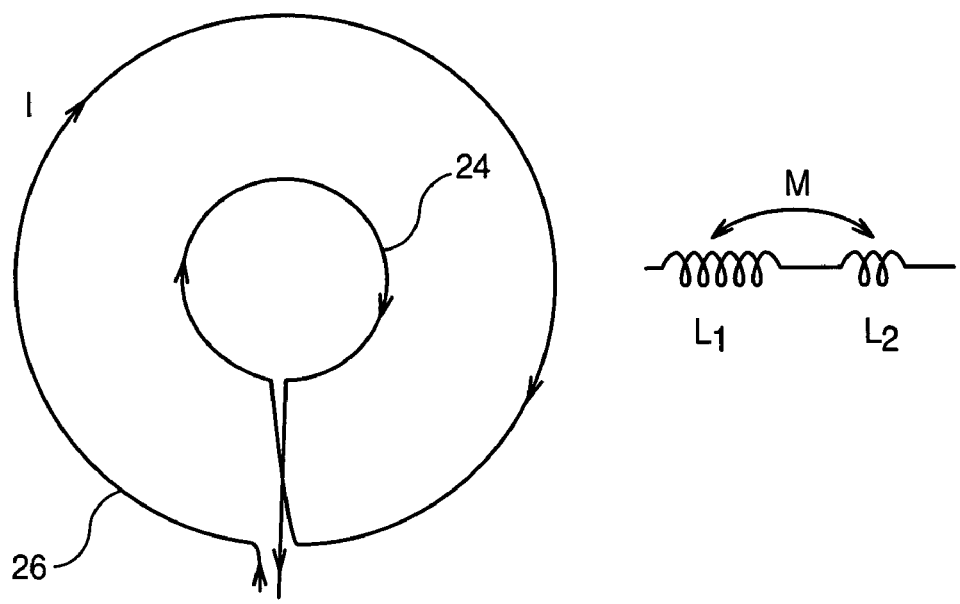
FIG. 2 represents an antenna of the reader according to the invention made up of a small turn and a large turn in series.

An embodiment of the reader according to the invention is shown in FIG. 2. Such an antenna includes a small turn 24 in series with a large turn 26, the two turns being wound in the same direction as shown by the arrows on the figure. If $L_1$ is the inductance of the large turn, $L_2$ the inductance of the small turn and M the mutual inductance between the two turns, the total inductance is therefore:

$$L=L_1+L_2+M$$

It should be noted that the two turns 24 and 26 may be independent or arranged in parallel provided they are wound in the same direction. But in this case, the resulting inductance would no longer be the sum of the two inductances and would be less than the smaller of the two inductances. Supposing that we are very close to resonance, a much larger current will have to be passed to obtain the same values of the electromagnetic field and thus much more energy will be required to obtain a similar result.

Figure 3:
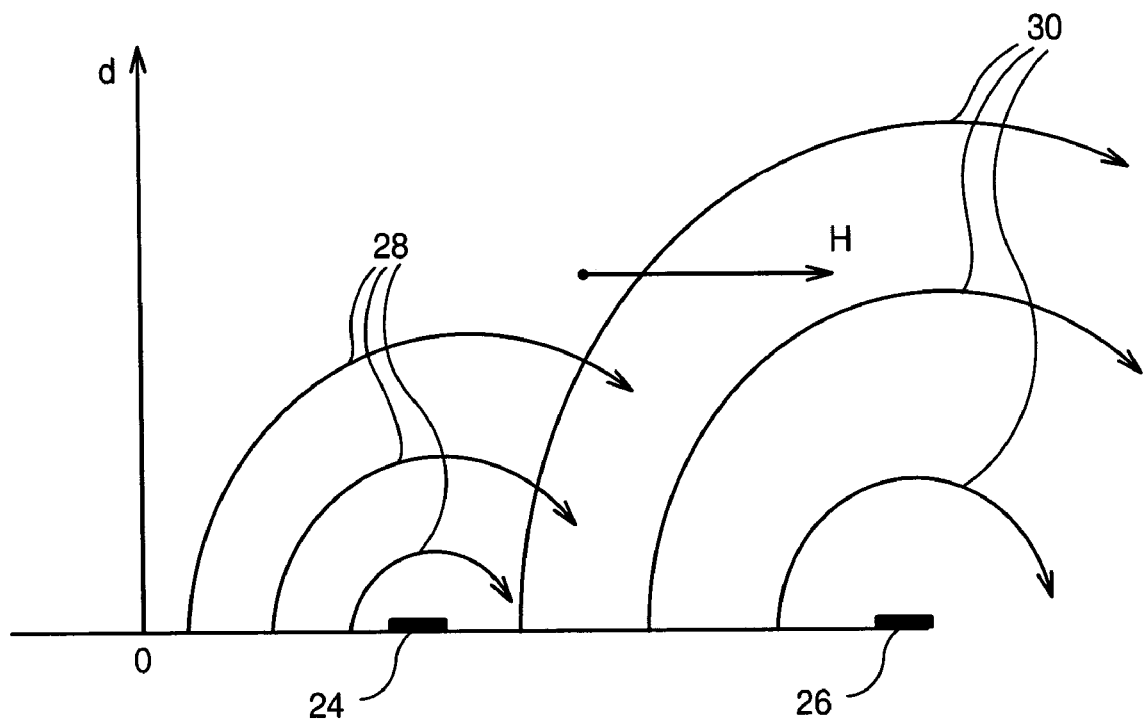
FIG. 3 is a diagram showing the electromagnetic field lines emitted by the reader according to the invention.

The electromagnetic field lines produced by the two turns in series are the resultant of field lines produced by each of the turns and are shown in FIG. 3. The turn with the smaller diameter 24 produces field lines 28 and the turn with the larger diameter 26 produces field lines 30 that are stronger than the field lines 28 at the same distance d (ordinate) from the antenna support represented by the X-axis. Since the direction of winding is the same for the two turns, the field lines 28 and 30 are also in the same direction, clockwise, for example. As a result, at every point there exists an electromagnetic field H with a component H parallel to the plane of the antenna support that has a value which is the sum of components in the same direction caused by the two turns and therefore which is much stronger than each of the two components. It should be noted that, regarding the component perpendicular to the antenna, it is small between the turns insofar as the two components perpendicular to the antenna support due to the two turns cancel each other.

Figure 4:
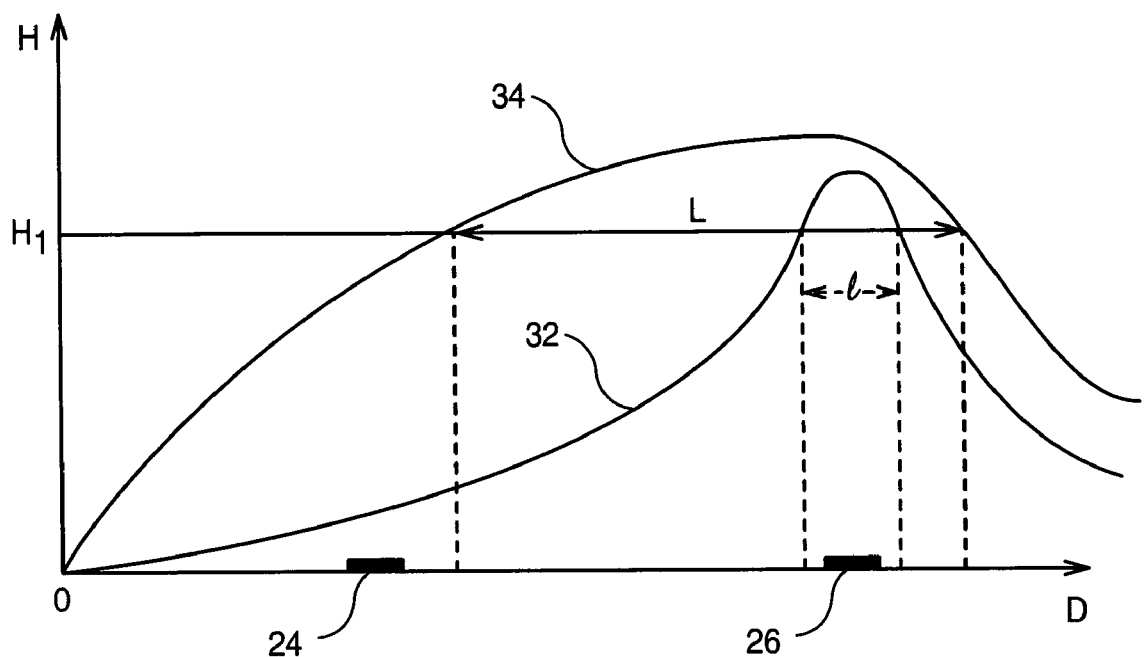
FIG. 4 is a diagram representing the value of the electromagnetic field emitted on the one hand by a classic reader and on the other hand by a reader according to the invention.

FIG. 4 represents the value of the radial component H parallel to the antenna support as a function of the distance D from the centre 0 common to the two turns. For the sake of comparison, curve 32 represents the value of the component H in the case where there is no small turn but only one large turn. The value increases as it is measured closer and closer to the turn. There is thus a maximum for the curve just above the turn as, at this location the field lines are horizontal (lines 30 on FIG. 3).

The other curve 34 is the value of the radial component H parallel to the antenna support when the antenna has the structure illustrated in FIG. 2, that is a small turn 24 in series with a large turn 26. In this case, the values of the components H due to the field emitted by the small and the large turn respectively add up as mentioned previously, which results in a curve 34 that increases rapidly from the centre of the turns.

An important parameter to obtain an efficient reading is that the value of the component H must have a value greater than or equal to a threshold value $H_1$, the latter determining the minimum distance to be maintained between the reader and the smart card. Assuming that this distance is 5 cm, that is to say a convenient distance to take the reading, the threshold value $H_1$ corresponds to the horizontal straight line shown in FIG. 4. As we can see, the value $H_1$ is respected over a large interval L that extends on either side of the large turn 26. On the other hand, in the absence of the small turn, the value $H_1$ will be reached only over an interval 1, which will not provide a sufficiently efficient reading.

While the turns may have a rectangular shape (while remaining concentric) for the implementation of the invention, it turns out that the circular shape is the one that suits best. To obtain good reading efficiency with rectangular turns, the operator must maintain the handle of the reader in a position parallel to the smart card. On the other hand, with turns having a circular shape and thus being radially symmetrical, it is obvious that the position of the reader handle does not make much of a difference for the reading, as even if the handle is not parallel to the card, the circular turns always produce the same electromagnetic field lines.

To obtain the best efficiency possible, it is important that the ratio between the diameter of the large turn and the diameter of the small turn remains between a minimum of 2 and a maximum of 3. This ratio helps obtain a trade-off between the extent of the operating zone (L on FIG. 4) and the range of the antenna. In this manner, the closer this ratio gets to 2, the more the operating zone is reduced, but the range increases. Conversely, as this ratio comes closer to 3, the operating zone gets larger, but the range gets lower.

Figure 5:
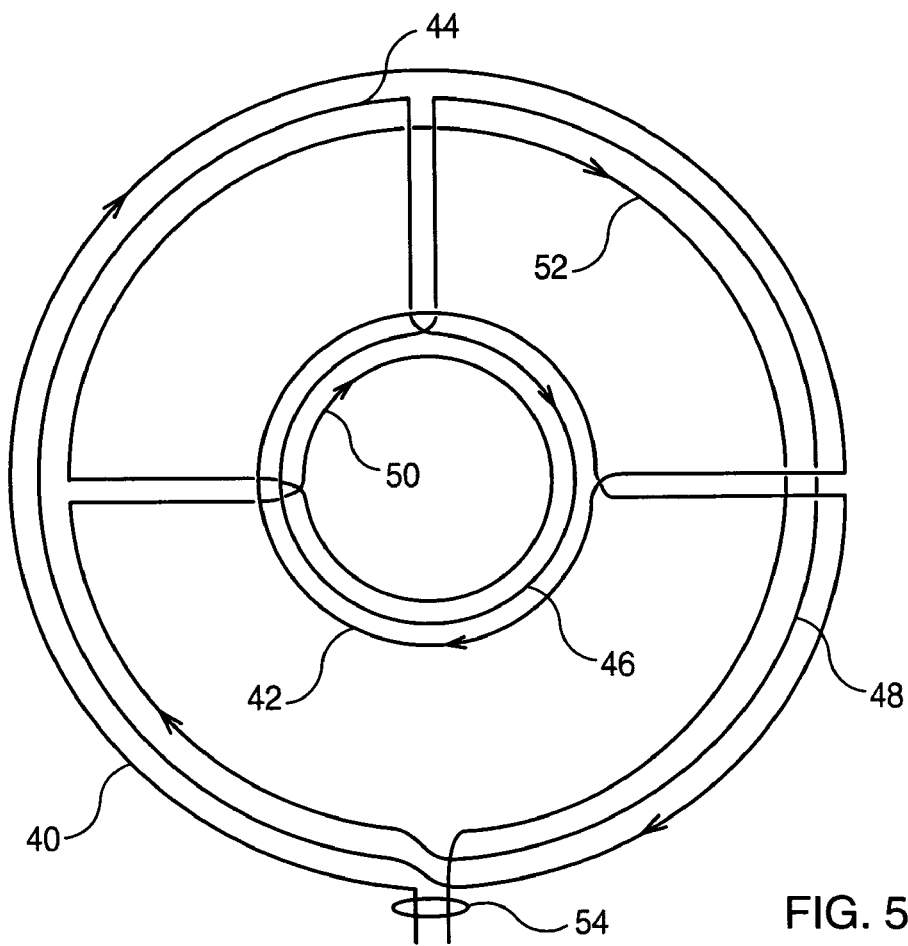
FIG. 5 is a representation of a preferred embodiment of the reader used in the system according to the invention.

In a preferred embodiment, the antenna of the reader is made up of several simple antennae (a large turn in series with a small turn) as shown in FIG. 2. In this manner, the antenna of the reader can be made in the way shown in FIG. 5. In this embodiment, the antenna wire 40 is wound clockwise over ¾ of a turn and is followed by a turn of smaller diameter 42. This small turn is followed by a winding of a larger diameter over ¾ of a turn followed by a smaller turn 46. This one is followed by a winding of larger diameter 48 over ¾ of a turn in series with a smaller turn 50. Finally, the latter is followed by a winding of a larger diameter 52 over ¾ of a turn returning to the starting point of the first winding, that is the power supply 54. Regarding the power supply 54, the geometry of this embodiment helps obtain a quasi-symmetrical inductive load for homogenous operation. Placing 3 simple antennae in series as shown in FIG. 2 helps, in this specific embodiment, obtain an inductance value that enables the antenna to be easily tuned to the operating frequency of the contactless system. It would be difficult, or even impossible, to tune the antenna to the operating frequency if the inductance value was too high. In addition, the geometry of the embodiment helps obtain a good trade-off between an electromagnetic field with a sufficiently high value and a reader with a reasonable size.

As already mentioned, the system according to the invention is pertinent for the identification of books in a bookshop or a library. For example, in a library, the reader provides good ergonomics and ease of use to search for a title or a volume from a known reference. To do this, a buzzer can be provided which sounds as soon as the correct book is detected. The proper arrangement of books can also be verified by checking the ordering of books on the basis of an increasing serial number, for example. Data associated with a book can also be checked without removing it from its shelf. It should be noted that the same type of use may be made for disks (CD ROM or DVD).

Such a system enables all applications where the products are referenced when entering the stores or the premises where they are stocked, listed at the shelf at the end of the day, and then detected at the cash desk during a purchase.

Although the reader according to the invention is particularly well adapted for smart cards that are all parallel to a plane perpendicular to the plane of the antenna of the reader, the latter may be used even if the smart card is not perpendicular to the plane of the antenna. Owing to its design, the reader can make its way between any objects to be identified, particularly between clothes in a clothing store.

The invention claimed is:

1. A contactless reading system, comprising
   a plurality of contactless smart cards, wherein each of said contactless smart cards is attached to an object with the aim of identifying this object by means of identification data contained in a chip of the smart card, a mobile reader equipped with an antenna to read said identification data contained in the chips of said smart cards, wherein said mobile reader comprises a flat antenna support on which is fixed at least three simple antennae connected in series, each antenna comprising a turn of small dimension connected in series with one turn of larger dimension, said turns being circular and concentric and having the same direction of winding, and wherein a ratio between the diameter of the circular turn of large dimension and the diameter of the circular turn of small dimension connected in series therewith is between 2 and 3, in order to obtain a maximum value of the component H of the electromagnetic field produced by the antenna parallel to said antenna support so that reception by a smart card of electromagnetic signal transmitted by said antenna is maximum when said antenna support is placed perpendicular to said card, wherein each turn of larger dimension is wound 270° and each turn of small dimension is wound 360°, the antenna wire being wound so as to respect a symmetry of the resulting antenna and to obtain a uniformly distributed electromagnetic field according to radial symmetry.

2. The contactless reading system of claim 1, wherein said mobile reader consists essentially of a flat support on which is fixed three simple antennae.

3. The contactless reading system of claim 1, wherein each object is arranged substantially parallel to a predefined plane.

4. The contactless reading system of claim 3, wherein the objects are books placed on shelves of a library.

5. The contactless reading system of claim 3, wherein said predefined plane is a vertical plane.

* * * * *